Patented Mar. 17, 1925.

1,529,778

UNITED STATES PATENT OFFICE.

HENRY B. FABER, OF BROOKLYN, NEW YORK, ASSIGNOR TO J. BEN DECKER, OF ELKTON, MARYLAND.

PYROTECHNIC COMPOSITION.

No Drawing.   Application filed June 18, 1924.   Serial No. 720,828.

*To all whom it may concern:*

Be it known that I, HENRY B. FABER, a citizen of the United States, and a resident of Brooklyn, in the county of Kings and State of New York, have invented certain new and useful Improvements in Pyrotechnic Compositions, of which the following is a specification.

My present invention relates to the manufacture of the pyrotechinc article called a "sparkler." This device is a short piece of iron wire coated over with a silvered material about one-eighth of an inch thick, which on being lighted throws out sparkles, very much like the sparks from a grinding wheel. The composition which burns and produces this effect is composed of dextrin and water made into a thick syrup, into which is incorporated aluminum powder, finely divided iron and steel filings, and barium nitrate. In order to produce the desired effect, magnesium carbonate is incorporated in the mixture.

Manufacturers have used this composition for a number of years and have been troubled by what they have called "fermenting." Often this composition is made up and within three hours time it starts to bubble and boil, foaming up over the top of the tub and generating a great deal of heat. When this takes place the composition is removed from the building and placed in the yard out of danger. A considerable loss is sustained by this action. Many attempts have been made to put in materials to prevent "fermentation," without satisfactory results.

There is a method in chemistry of determining nitrates called the Kjeldahl process, which consists in reducing the nitrates to ammonia with hydrogen. Often the hydrogen is generated by the action of water on finely divided aluminum. In the sparkler composition, as stated above, there are present a nitrate, finely divided aluminum, and water, all of the essentials to produce first hydrogen and later ammonia from the reduction of the nitrate, according to the Kjeldahl process. When the composition begins to boil and give off gas, a very noticeable odor of ammonia is present, which increases until it is very offensive. Aluminum acting on water produces hydrogen by the decomposition of the water. This hydrogen reducing the nitrate of barium not only produces ammonia, which in itself gives an alkaline reaction, but the by-products of the reaction, other than that of ammonia, are also alkaline. It is a known fact that the speed of the reaction between finely divided aluminum and water is increased with the increased alkalinity of the solution. Consequently when once the action starts the by-products of this reaction accelerate to greater chemical activity the balance of the materials. Sometimes six or eight hours elapse before any reaction starts, and then, when once started, it seems to progress rapidly until the entire mass has undergone a change.

In testing the various materials in this composition I found that the magnesium carbonate was noticeably alkaline. Occasionally the tap water used is alkaline. It is likely that in almost all of the operations where this composition is used at some time or other an alkali is developed either from the materials used or from the water. Consequently my invention consists in using a "buffer," which will prevent the development of an alkaline reaction in the slurry. There are a number of buffers which might be used, which act only when the alkaline content of a mixture develops. Sodium acetate is such a buffer. One of the most successful buffers is calcium mono acid phosphate. This in itself is not strongly acid, but will prevent the building up of a strong alkaline reaction in a slurry in which it is used. I found that the trouble could be held in check by the use of a buffer such as calcium phosphate, as mentioned above, in an amount sufficient to act in the capacity of a neutralizing agent for any alkali developed over a period of time sufficient to insure easy handling of the material in practice. This material is inert as far as the pyrotechnic qualities of the slurry are concerned. It was not found desirable to eliminate completely the magnesium carbonate and consequently calcium phosphate was used in an amount which would counterbalance the slight alkalinity present due to the use of the magnesium carbonate, and further give to the slurry a distinct acid reaction during the period necessary for its use.

Out of the many soluble and insoluble mild acids and acid salts which we have in chemistry, all of which would serve in a more or less satisfactory manner the above purpose, I have chosen calcium mono phosphate as the best example.

In the claims where I have mentioned an alkali buffer it is understood that this refers to a buffer used against an alkaline condition.

The proportion of buffer required will vary between wide limits, according to the specific materials used, but may be readily determined by one skilled in this art. A satisfactory proportion is found to be between 3 and 5% of the total weight of the dry composition, although, as stated above, other proportions may be used.

I claim:

1. A pyrotechnic composition including a finely divided metal, a substance capable of reacting therewith to form a gas, and an alkaline material, and a buffer in such amount as to maintain an acid reaction to the mass, whereby reaction between the finely divided metal and the first mentioned substance is prevented.

2. A pyrotechnic composition, including finely divided aluminum, a material having an alkaline reaction and moisture, and a buffer in such amount as to maintain an acid reaction to the mass whereby reaction between the aluminum, the material having an alkaline reaction, and the moisture is prevented.

3. A pyrotechnic composition including aluminum powder, a nitrate, a carbonate, and water, and a material having an acid reaction, said last named material being in sufficient excess to impart a distinct acid reaction to the entire mixture.

In testimony whereof, I affix my signature.

HENRY B. FABER.